United States Patent Office 2,725,263
Patented Nov. 29, 1955

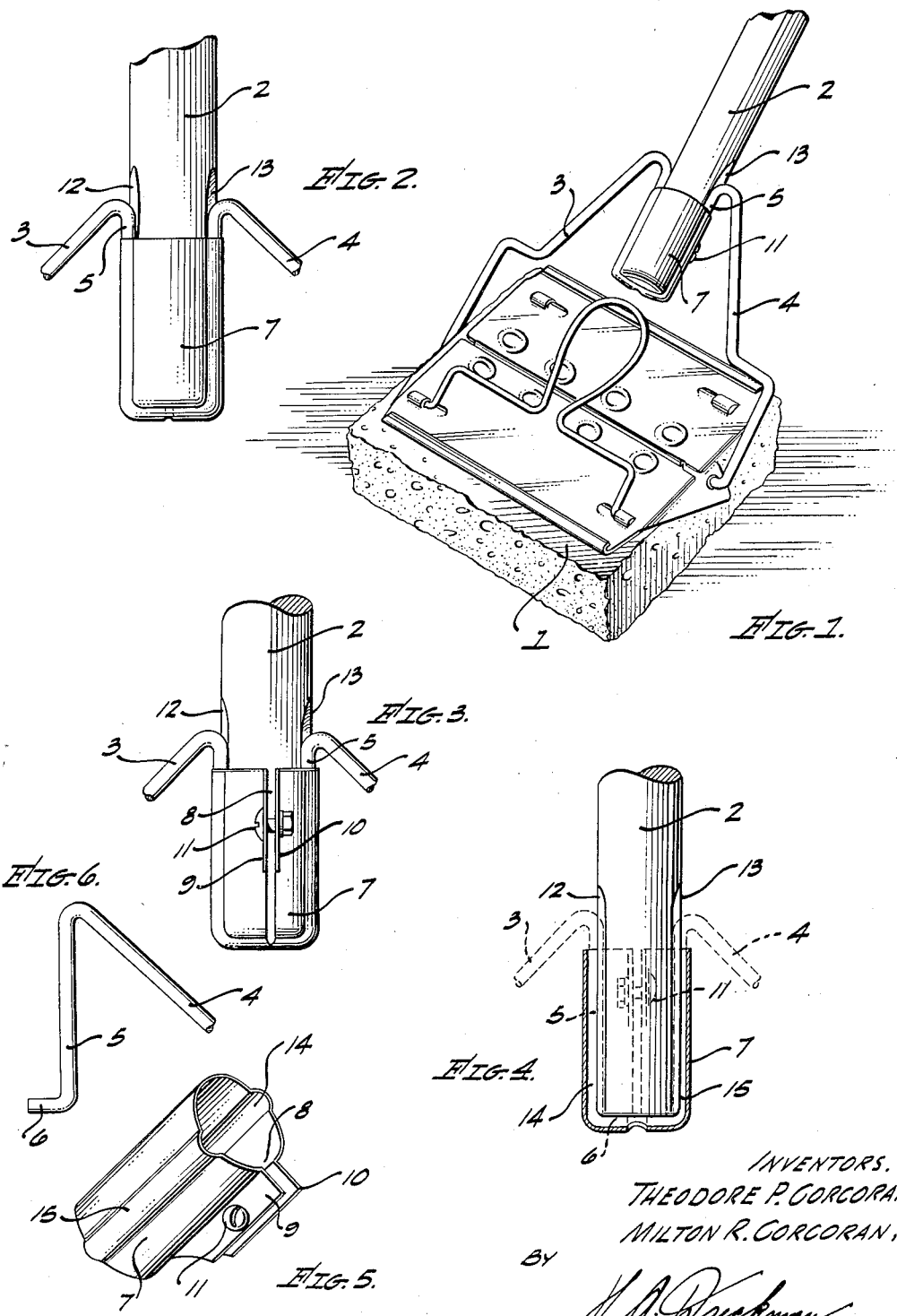

2,725,263

MOUNTING FOR A DETACHABLE HANDLE

Theodore P. Corcoran and Milton R. Corcoran, Long Beach, Calif.

Application March 20, 1953, Serial No. 343,768

1 Claim. (Cl. 306—19)

This invention relates to a means of securing a detachable handle to an article having a bail, such as a mop, a scrub brush, a sweeper, or the like.

An object of our invention is to provide a means of securing the detachable handle to the bails of the article in such a manner that the handle will not rotate, and also will be securely held on the article and still will be readily detachable when desired.

An object of our invention is to provide a novel mounting means for a detachable handle in which one end of the bails are fitted in longitudinal grooves in the handle, and a metal ferrule is clamped around the bails and the handle, thus holding the bails in the grooves and also preventing the handle from slipping out of engagement with the bails.

Another object of our invention is to provide a novel mounting for a detachable handle which is simple in construction, inexpensive to manufacture, and which can be readily operated by the user.

Other objects, advantages and features of invention may appear from the accompanying drawing, the subjoined detailed description and the appended claim.

In the drawing:

Figure 1 is a perspective view of a mop with our mounting means for the handle thereon.

Figure 2 is a fragmentary side elevation of the handle showing the ferrule at the lower end thereof.

Figure 3 is a view similar to Figure 2 but showing the opposite side of the ferrule.

Figure 4 is a fragmentary side elevation of the handle and showing the ferrule in section.

Figure 5 is a perspective view of the ferrule.

Figure 6 is a fragmentary side elevation of one of the bails.

Referring more particularly to the drawing, the numeral 1 indicates an article, such as a mop, to which a handle 2 is attached, and the handle being detachable from the mop, or the like, at the will of the user. The article 1 could be a brush, a sweeper, or other devices of a similar nature which are used upon a floor, a wall or the like. To mount the article 1 on the handle 2 we provide a pair of bails 3 and 4, these bails being preferably formed of heavy wire, and are separate units although they are identically constructed. Each of the bails is bent downwardly at its upper end, as shown at 5, and the lower end of the bail is then bent horizontally, as shown at 6, to form a hook. The purpose of this bend in the bails will be evident from the following description:

A cup-like ferrule 7 is closed at the bottom and open at the top. The ferrule 7 fits onto the bottom of the handle 2, substantially as shown. An opening 8 is formed on one side of the ferrule 7 and extends lengthwise thereof. Flanges 9 and 10 are provided on each side of the opening 8 and these flanges are integral with the material of the ferrule. A bolt 11 extends through these flanges for the purpose of clamping the ferrule 7 tightly around the handle 2 and also around the bent portions 5 of the bails 3 and 4 to hold the entire assembly securely on the handle 2.

The handle 2 is provided with longitudinal grooves 12—13 which extend longitudinally of the handle 2 and at the bottom end thereof. The bent portions 5 of the bails 3—4 fit in the grooves 12—13 respectively, and the same portion 5 also projects partially into arcuate recesses 14—15 formed in the ferrule 7. Thus when the ferrule is clamped in position the portions 5 of the bails 3 and 4 will act as a key to prevent rotation of the handle 2 in the ferrule. The lower end of the bails 3 and 4 being bent inwardly, as shown at 6, cannot come out of the ferrule 7 since the hook 6 will prevent this. The ferrule 7 being split by the opening 8 can also be tightly wrapped or clamped around the lower part of the handle 2, thus securely holding the handle and the bails in assembled position. Also since the ferrule is closed at the bottom, i. e., shaped somewhat like a cup, this will tend to hold the parts in proper assembled position and also will prevent their coming apart.

Having described our invention, we claim:

A device for attaching a handle to an article including a pair of rod members, means for securing one end of each of said members to an article, said members projecting upwardly, a handle, a portion of each of the members extended downwardly parallel to the handle and terminating in a right angled hook, said handle having longitudinally extended grooves into which said downwardly extended portions are fitted with the hooks underlying the end of said handle, a ferrule having a wall closing the bottom thereof surrounding said handle and the downwardly extended portions with said wall being in bearing engagement with said hooks and means clamping said ferrule about said handle.

References Cited in the file of this patent

UNITED STATES PATENTS

| 113,244 | Baker | Apr. 4, 1871 |
|---|---|---|
| 619,941 | Cochrun | Feb. 21, 1899 |
| 937,130 | Williams | Oct. 19, 1909 |
| 1,718,436 | Rocquin | June 25, 1929 |
| 1,879,325 | Kootz | Sept. 27, 1932 |